United States Patent
Woolston et al.

(10) Patent No.: US 10,688,639 B2
(45) Date of Patent: Jun. 23, 2020

(54) FRONT FINAL GEAR ASSEMBLY TO PROPSHAFT CLIPPING STRUCTURE AND INSTALLATION METHOD

(71) Applicant: Honda Motor Co., Ltd., Tokyo (JP)

(72) Inventors: Matthew P. Woolston, Hilliard, OH (US); Scott D. Batdorf, Raymond, OH (US); Dustin M. Schroeder, Milford Center, OH (US)

(73) Assignee: Honda Motor Co., Ltd., Tokyo (JP)

( * ) Notice: Subject to any disclaimer, the term of this patent is extended or adjusted under 35 U.S.C. 154(b) by 118 days.

(21) Appl. No.: 15/961,202

(22) Filed: Apr. 24, 2018

(65) Prior Publication Data

US 2019/0321953 A1    Oct. 24, 2019

(51) Int. Cl.
*B25B 27/20* (2006.01)
*F16D 1/08* (2006.01)

(52) U.S. Cl.
CPC ............ *B25B 27/20* (2013.01); *F16D 1/0829* (2013.01); *F16D 2250/0084* (2013.01)

(58) Field of Classification Search
CPC .................. B25B 27/20; F16D 1/0829; F16D 2250/0084; F16D 1/0835; F16D 2300/12; Y10T 29/5363; Y10T 29/4987; Y10T 29/53657
See application file for complete search history.

(56) References Cited

U.S. PATENT DOCUMENTS

| | | |
|---|---|---|
| 3,537,163 A | 11/1970 | Steidl |
| 4,138,146 A | 2/1979 | Rumble |
| 5,667,332 A | 9/1997 | Lindholm |
| 6,241,616 B1 | 6/2001 | Lightcap |
| 6,354,952 B1 | 3/2002 | Boulton et al. |
| 6,582,151 B2 | 6/2003 | Hopson |
| 6,640,405 B2 | 11/2003 | Ino |
| 7,377,854 B2 | 5/2008 | Wormsbaecher |
| 7,553,238 B2 | 6/2009 | Wormsbaecher et al. |
| 7,614,818 B2 | 11/2009 | Gutierrez et al. |
| 7,708,645 B2 | 5/2010 | Miller et al. |
| 7,721,613 B2 | 5/2010 | Halbin et al. |
| 8,060,999 B2 | 11/2011 | Fistor |
| 8,062,137 B2 | 11/2011 | Arden et al. |
| 8,226,489 B2 | 7/2012 | Ooba et al. |
| 8,403,764 B2 | 3/2013 | Kobayashi |
| 8,714,293 B2 | 5/2014 | Despres-Nadeau |
| 8,776,347 B2 | 7/2014 | Virkler et al. |
| 8,784,220 B1 | 7/2014 | Katke |
| 8,864,590 B2 | 10/2014 | Sugiyama et al. |

(Continued)

*Primary Examiner* — Lee A Holly
(74) *Attorney, Agent, or Firm* — Rankin, Hill & Clark LLP (57) ABSTRACT

A method of securing a yoke to a clutch includes arranging a circlip in a circumferential channel in an outer surface of a tool and inserting the tool inside a bore in the clutch. Legs arranged in the channel extend to expand the circlip to an expanded state to arrange the circlip outside of the channel in a circumferential groove in the bore. A spacer is snapped onto a portion of the clutch and arranged between two ends of the circlip to secure the circlip in the expanded state. The tool is then removed from the bore, and a yoke is inserted into the bore. The spacer is then removed from the bore allowing the circlip to contract such that the spacer partially occupies both the groove and a circumferential depression in the yoke. This secures the yoke to the clutch.

20 Claims, 6 Drawing Sheets

(56) References Cited

U.S. PATENT DOCUMENTS

| | | |
|---|---|---|
| 8,870,489 B2 | 10/2014 | Langer et al. |
| 9,695,878 B2 | 7/2017 | Nicholas et al. |
| 2010/0050417 A1* | 3/2010 | Stomski .................. B25B 27/20 29/525 |
| 2012/0243930 A1 | 9/2012 | Pastoors et al. |
| 2017/0016484 A1 | 1/2017 | Sugiyama et al. |
| 2017/0130777 A1 | 5/2017 | Oram et al. |
| 2017/0248169 A1 | 8/2017 | Gordon |
| 2017/0298993 A1 | 10/2017 | Mabe et al. |

* cited by examiner

FRONT FINAL GEAR ASSEMBLY TO PROPSHAFT CLIPPING STRUCTURE AND INSTALLATION METHOD

BACKGROUND

Vehicle power trains use a transmission (e.g., a gearbox) for transmitting power from an engine and to a propshaft, in order to turn the drive wheels of a vehicle. Universal joints can be used to transmit power from the engine, through a variable angle, to a drive shaft (e.g., a propshaft). Several strategies include the use of a spring-loaded plunge joint for connecting the front final gear assembly to the propshaft, which allows for some limited axial movement of the propshaft relative to the engine so as to accommodate a change in effective length of the propshaft due to engine rocking and other effects. However, in some designs, it is not feasible or desired to use a spring-loaded plunge joint.

BRIEF DESCRIPTION

According to one aspect, a method of arranging a circlip inside a tube includes providing a tool including a circumferential channel in an outer surface of the tool, and arranging the circlip in the channel. The circlip has a first diameter when arranged in the channel. The tool and the circlip are arranged inside the tube, and the tool is actuated to expand the circlip from the first diameter to a second diameter larger than the first diameter so that the circlip is arranged in a circumferential groove in an inner surface of the tube and is not arranged in the channel. The circlip is secured to have the second diameter; and the tool is removed from the tube.

According to another aspect, a method of joining a propshaft yoke to a clutch of a vehicle includes providing an elastic circlip, a circlip-expanding tool, the yoke, the clutch, and a spacer, wherein the clutch includes a bore, and wherein the tool includes a circlip-accepting portion configured to be arranged inside the bore and a circumferential channel in an outer surface of the circlip-accepting portion. The circlip is removably secured in the channel, and the circlip has a first diameter when removably secured in the channel. The circlip-accepting portion of the tool and the circlip are arranged inside the bore. The tool is actuated to expand the circlip from the first diameter to a second diameter larger than the first diameter so that the circlip is arranged in a circumferential groove in an inner surface of the bore and is not arranged in the channel. At least a portion of the spacer is arranged between two free ends of the circlip when the circlip has the second diameter so that the circlip is not arranged in the channel. The circlip-accepting portion is removed from the bore, and the circlip remains in the groove. The yoke is arranged inside the bore, and the at least a portion of the spacer is removed from between the two free ends of the circlip such that the circlip contracts toward the first diameter and is thereby arranged partially within the groove and partially within a circumferential depression in an outer surface of the yoke to thereby join the yoke to the clutch.

According to another aspect, a tool to expand a diameter of an associated circlip comprises a cylindrical circlip-accepting portion, and a circumferential channel in an outer surface of the circlip-accepting portion. The channel is configured such that the associated circlip can be selectively secured in the channel while having a first diameter. The tool includes a plurality of legs arranged in the channel and including circlip-contacting surfaces. The legs are selectively moveable between a retracted position, wherein the circlip-contacting surfaces are arranged radially inside the outer surface of the circlip-accepting portion, and an extended position, wherein the circlip-contacting surfaces are arranged radially outside the outer surface of the circlip-accepting portion. The tool includes an actuator for actuating the tool to move the legs between the retracted position, wherein the associated circlip arranged in the channel has the first diameter, and the extended position to expand the associate circlip to have a second diameter larger than the first diameter such that the associate circlip is not arranged in the channel.

According to another aspect, a generally C-shaped spacer comprises a base having a first end, a second end distal from the first end, and a length measured between the first end and the second end. A first arm extends down from a first shoulder arranged at the first end of the base, and a second arm extending down from a second shoulder arranged at the second end of the base. The first arm includes a first finger and a second finger extending from a first free end of the first arm that is distal to the first shoulder; and a first tab protruding inward from the first arm and towards the second arm and extending along a length of the first arm. The second arm includes a third finger and a fourth finger extending from a second free end of the second arm that is distal to the second shoulder; and a second tab protruding inward from the second arm and towards the first arm and extending along a length of the second arm. A shelf extends from the base in a direction perpendicular to the length of the base and perpendicular to the lengths of the first and second arms. The shelf includes a trunk and a wall. The trunk is arranged between the wall and the base and the trunk has a shorter length than the wall, thereby defining two gaps on either side of the trunk between the wall and the base.

DETAILED DESCRIPTION

The present subject matter comprises a vehicle assembly and related methods that include the use of a circlip to secure a vehicle propshaft, more specifically a front propshaft yoke, relative to a vehicle four wheel drive (4WD) clutch attached to a front final gear assembly.

Figure 1:
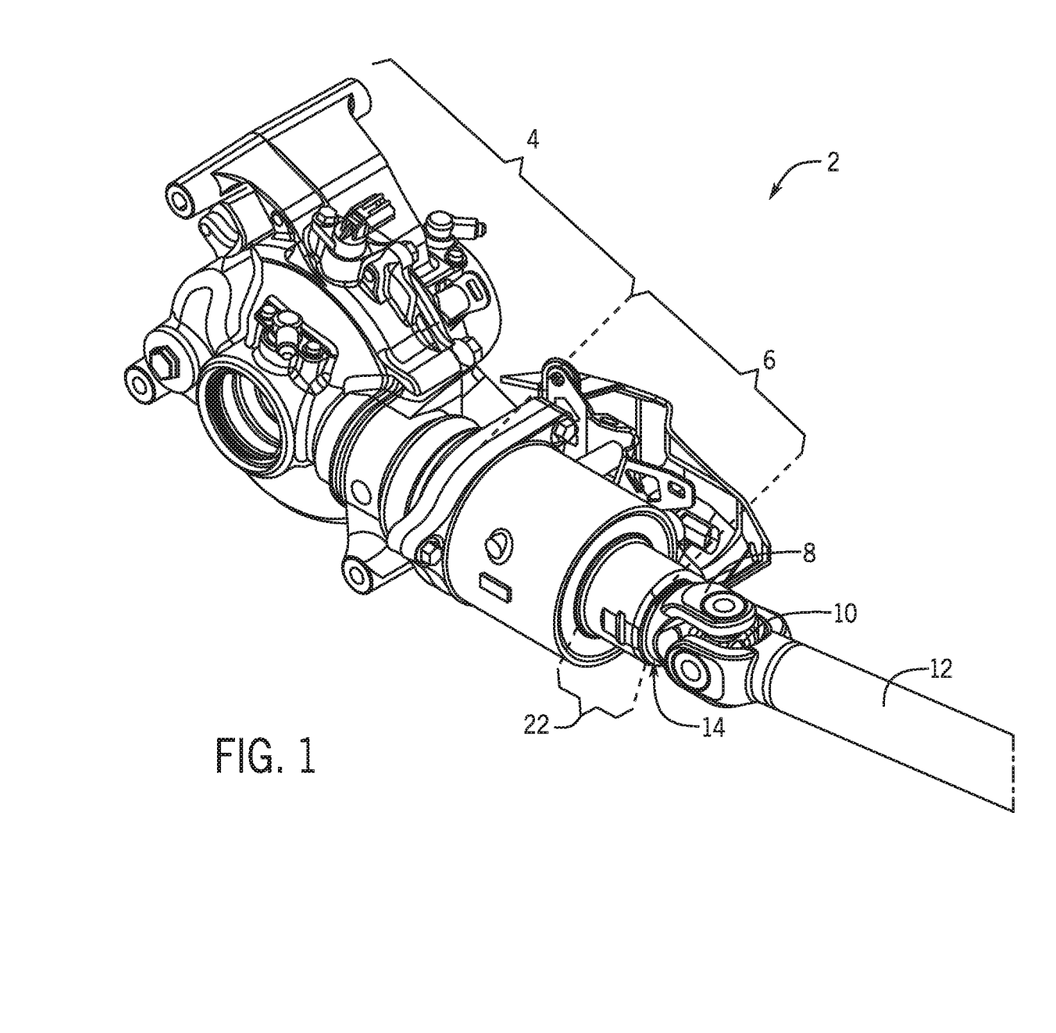
FIG. 1 is perspective view of a vehicle assembly in accordance with the present subject matter.

Referring now to the figures, and specifically to FIG. 1, the vehicle assembly 2 includes a front final gear assembly 4, which can be connected to a vehicle engine (not shown). The gear assembly 4 is not particularly limited by the present subject matter, and can have a different configuration from that depicted in the figures. The gear assembly 4 is connected to a four wheel drive (4WD) clutch 6, which is connected to a front yoke 8, which is connected by a front yoke joint 10 to a propshaft 12. The propshaft 12 is operably connected to one or more drive wheels (not shown) of a vehicle for turning the drive wheels. The yoke 8 is connected to the 4WD clutch 6 by a circlip joint 14 that allows for rotational movement of the yoke 8 relative to the clutch 6 while inhibiting axial movement of the yoke 8 relative to the clutch 6.

The construction and assembly of the circlip joint 14 formed between the yoke 8 and the clutch 6 will be further explained with particular reference to FIGS. 2-10. A circlip-expanding tool 16 can be used to arrange an annular elastic circlip 18 inside a bore 20 of the clutch 6. As depicted in the figures, the portion of the clutch 6 including the bore 20 may be in the general shape of a tube. For convenience and clarity, only a tube-shaped portion 22 of the clutch 6 is shown in FIGS. 5, 6, and 8-10. The clutch 6 is not particularly limited by the present subject matter, and can have a different configuration from that depicted in the figures, except as explained with respect to the tube-shaped portion 22.

The circlip 18, which forms a part of the circlip joint 14, can comprise a generally annular ring with two turned-out ends 24, 26 spaced from one another to create an open ring structure. As depicted, the two ends 24, 26 are turned radially away from a radial center of the circlip 18. In one non-limiting embodiment, the two ends 24, 26 of the circlip 18 are free of eyelets typically present on conventional circlips. The circlip 18 can be made of any suitable material including for example, metal, plastic, a composite material, or combinations thereof.

The circlip 18 can be elastic, and when in a relaxed state and not subject to tension from expansion or compression forces for example, the circlip 18 has a relaxed diameter. Compression or expansion forces can be applied to the circlip 18 to respectively either decrease or increase the diameter of the circlip 18 from the relaxed diameter. When the compression or expansion forces are withdrawn, the circlip 18 will return towards the relaxed diameter, being urged back toward the relaxed state by the elastic force of the circlip 18.

The relaxed diameter can be established based on the requirements of the circlip joint 14, such as the size and configuration of the yoke 8 and the clutch 6. In one non-limiting embodiment, the circlip 18 is made of a material that has an average cross-sectional thickness of 1-5 mm, and when in a relaxed state, has a relaxed diameter of 35-45 mm. The cross-sectional shape of the material forming the circlip 18 may be round, square, rectangle, oval, or other shape as desired. In one non-limiting embodiment, the cross-sectional shape of the material forming the circlip 18 is generally round. The two ends 24, 26 of the circlip 18 may have a length of 4-8 mm as measured from an inside diameter of the circlip 18 to the tip of each of the ends 24, 26; and when in a relaxed state, the two ends 24, 26 can be spaced apart 1-6 mm from each other. When in a compressed state (i.e., when subject to a compression force), the circlip 18 can have a compressed diameter smaller than the relaxed diameter, and the two ends 24, 26 may be closer together than when in the relaxed state. When in an expanded state (i.e. when subject to an expansion force), the circlip 18 can have an expanded diameter larger than the relaxed diameter, and the two ends 24, 26 may be further apart than when in the relaxed state.

Figure 5:
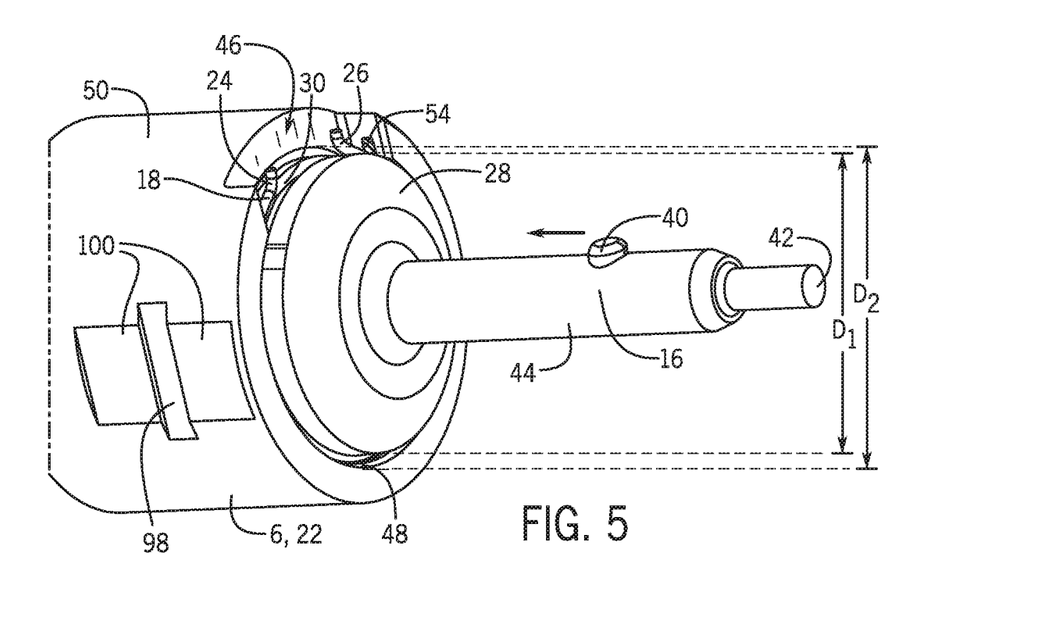
FIG. 5 is a perspective view of an assembly including the circlip-expanding tool of FIG. 4 arranged inside a bore in a tube-shaped portion of a clutch in accordance with the present subject matter.

The circlip-expanding tool 16 can be used to insert the circlip 18 inside the bore 20 of the clutch 6. The tool 16 includes a circlip-accepting portion 28 configured to be arranged inside the bore 20, and a circumferential channel 30 arranged in a circumferential outer surface 32 of the circlip-accepting portion 28. The size of the channel 30 is configured to allow the circlip 18 to be arranged partially or completely within the channel 30 depending on the relaxed diameter of the circlip 18 and a diameter of the channel 30. The circlip-accepting portion 28 of the tool 16 may have a general shape of a cylinder, with the channel 30 arranged in the outer surface 32 of the circlip-accepting portion 28. The circlip-accepting portion 28 can have a height H that is less than a diameter $D_1$ of the circlip-accepting portion 28. The diameter $D_1$ of the circlip-accepting portion 28 is smaller than the diameter $D_2$ of the bore 20, as depicted in FIG. 5.

Figure 2:
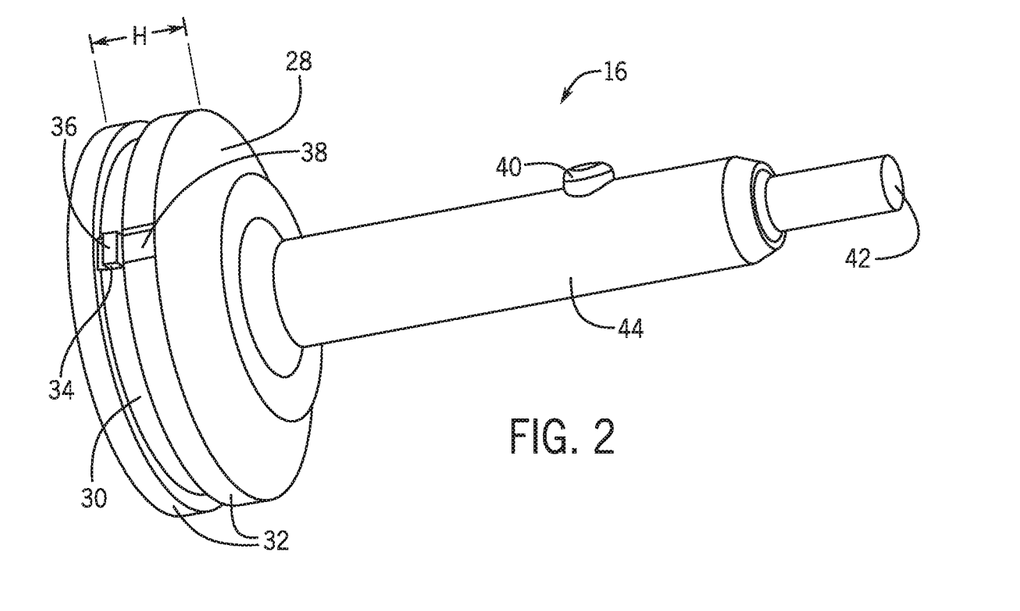
FIG. 2 is a perspective view of a circlip-expanding tool with an actuator button and retracted legs in accordance with the present subject matter.

The channel 30 can be arranged in the circlip-accepting portion 28, such that the outer surface 32 of the circlip-accepting portion 28 is present on either side of the channel 30 (i.e., to the right and left of the channel 30 in FIG. 2). However, this is not required, and the channel 30 may be arranged such that the outer surface 32 of the circlip-accepting portion 28 is present on only one side of the channel 30 (e.g., only to the right or only to left of the channel 30 in FIG. 2).

The tool 16 also includes a plurality of extendable legs 34 arranged in the channel 30. Each of the legs 34 may include a circlip-contacting surface 36, and optionally a clutch-contacting surface 38, also referred to herein as a tube-contacting surface. The circlip-contacting surface 36 may be arranged radially outside the clutch-contacting surface 38. In one non-limiting embodiment, the legs 34 are evenly spaced around the circumference of the channel 30. Alternatively, the legs 34 may be non-evenly spaced around the circumference of the channel 30. In the figures, only two legs can be seen. However, it will be appreciated that the tool 16 can include 3, 4, 5, or more legs 34 arranged in the channel 30. In one non-limiting embodiment, the tool 16 includes three legs 34 evenly spaced around the circumference of the channel 30.

Figure 3:
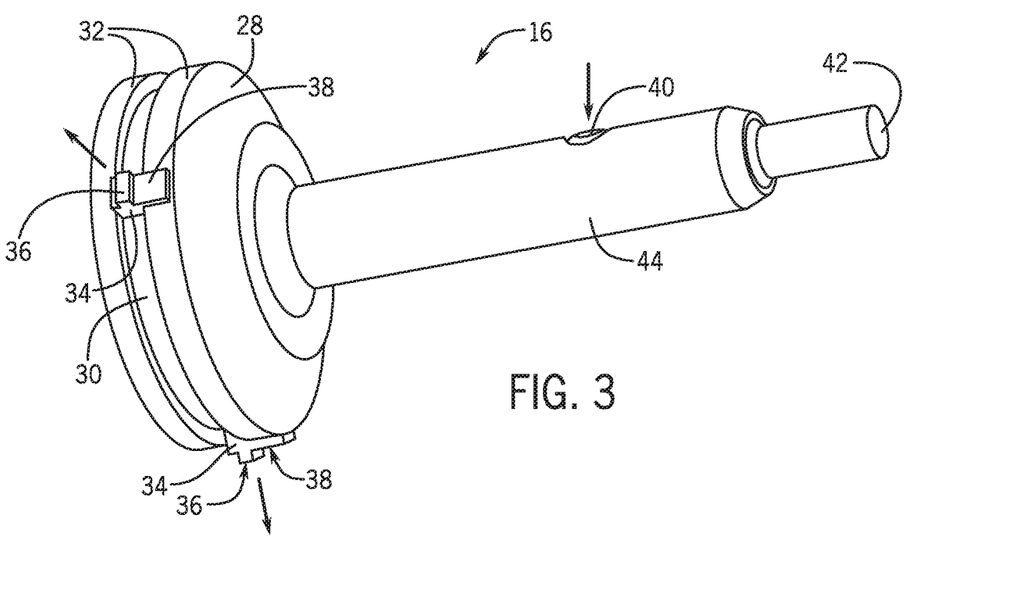
FIG. 3 is a perspective view of the circlip-expanding tool of FIG. 2, with a depressed actuator button and extended legs in accordance with the present subject matter.
Figure 4:
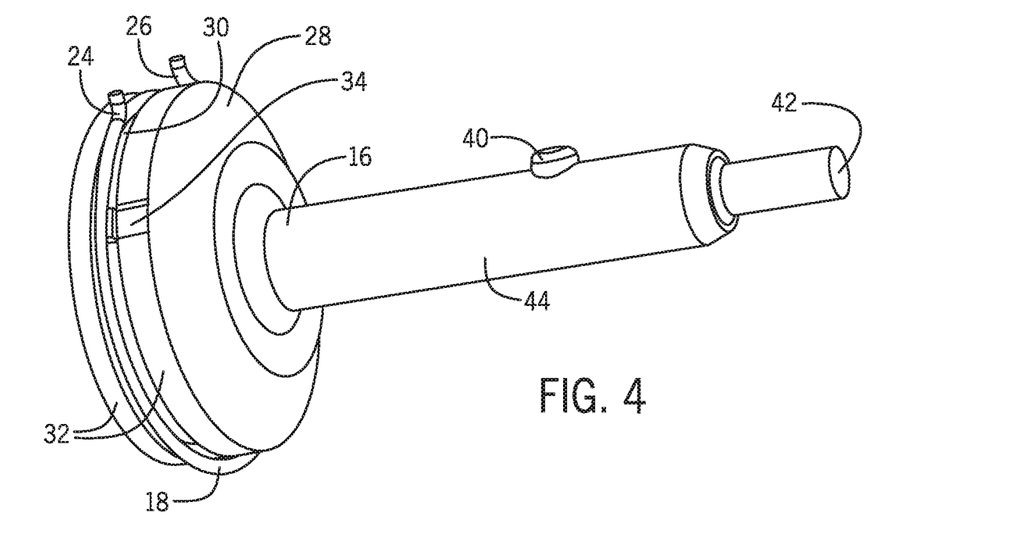
FIG. 4 is a perspective view of the circlip-expanding tool of FIG. 2, with a circlip snapped into a channel on the tool in accordance with the present subject matter.

The tool 16 can be actuated to selectively move the legs 34 between a retracted position (FIG. 2) and an extended position (FIG. 3). In one non-limiting embodiment, when the tool 16 is not actuated, the legs 34 are in a retracted position, and when the tool 16 is actuated, the legs 34 extend radially outward from the retracted position to an extended position. When the legs 34 are in the retracted position, at least the circlip-contacting surfaces 36 of the legs 34 are arranged radially inside the outer surface 32 of the circlip-accepting portion 28 of the tool 16. In one embodiment when the legs 34 are in the retracted position, both the circlip-contacting surface 36 and the clutch-contacting surface 38 are arranged radially inside the outer surface 32 of the circlip-accepting portion 28 of the tool 16. When the legs 34 are in the extended position, at least a portion of each of the legs 34, including the circlip-contacting surface 36, is arranged radially outside the outer surface 32 of the circlip-accepting portion 28 of the tool 16. In one embodiment, the circlip-contacting surface 36 and the clutch-contacting surface 38 are arranged radially outside the outer surface 32 of the circlip-accepting portion 28 of the tool 16 when the legs 34 are in the extended position.

The tool can include an actuator 40 for actuating the tool 16 to move the legs 34 between the retracted and extended positions. The tool 16 may be manually powered, and the actuator may include a lever or other mechanism to move the legs 34 between the retracted and extended positions. The tool 16 may be powered other than manually, and may comprise a power tool, for example a pneumatic-powered tool, an electric-powered tool, a gasoline-powered tool, or a tool powered by another power source. The power source is not particularly limited by the present subject matter, and can include an on-board power source arranged on the tool, for example a battery and electric motor; or can include an external power source to which the tool can be coupled. In one embodiment, the tool 16 is a power tool and power (in the form of electricity, compressed gas, etc.) for moving the plurality of legs 34 is delivered to the tool 16 through a power connector 42. In one non-limiting embodiment, the tool 16 is a pneumatic-powered tool and compressed gas is delivered from an external power source and to the tool 16 through the power connector 42, which can comprise a pneumatic connection port. In another embodiment, the tool 16 is an electric-powered tool and can include an on-board electric motor and a selectively removable battery.

The tool 16 may include a handle 44 for holding and manipulating the tool 16 by hand. The actuator 40, for example a button as depicted in the figures, can be included on the handle 44, included elsewhere on the tool 16, or included in a remote control for the tool 16. When the button is not depressed, the legs 34 may be in the retracted position (FIG. 2). When the button is depressed as indicated for example, by the downward-pointing arrow on the right side of FIG. 3, the legs 34 may for example move radially out from the channel 30 as indicated by the two radially-pointing arrows on the left of FIG. 3 to the extended position (FIG. 3). The handle 44 can have a diameter smaller (as depicted in the figures), the same, or larger than the diameter $D_1$ of the circlip-accepting portion 28 of the tool 16. In one embodiment as depicted in the figures, the handle 44 has a diameter smaller that the diameter $D_1$ of the circlip-accepting portion 28.

When the legs are in the retracted position, the circlip 18 can be snapped into the channel 30 (FIG. 4), wherein the circlip 18 has a first diameter. In this arrangement, the first diameter can be equal to or larger than the relaxed diameter, and at least a portion of the circlip 18 is arranged in the channel 30. If the first diameter is larger than or equal to the relaxed diameter, then the circlip 18, except for the two ends 24, 26, can be arranged entirely radially inside the outer surface 32 of the circlip-accepting portion 28 of the tool 16. If the first diameter is equal to the relaxed diameter, then the circlip 18, except for the two ends 24, 26, can alternatively be arranged only partially radially inside the outer surface 32 of the circlip-accepting portion 28 of the tool 16.

In any event, the elastic force of the circlip 18 urges the circlip 18 to have the first diameter and remain at least partially within the channel 30, and thereby inhibits expansion of the circlip 18, and inhibits the circlip 18 from inadvertently coming out of the channel 30 and disengaging from the tool 16. When the circlip 18 is snapped into the channel 30 and has the first diameter, the circlip-accepting portion 28 of the tool 16, along with the circlip 18, can be arranged for example, as indicated by the left-pointing arrow in FIG. 5 to be inside the bore 20 of the clutch 6 (FIG. 5). As depicted however, the two turned-out ends 24, 26 of the circlip 18 extend radially outward. To accommodate for the two turned-out ends 24, 26 of the circlip 18, the clutch 6 can include a slot 46 at the open end 48 of the bore 20. The slot 46 provides an opening in the wall of the clutch 6 that extends through the thickness of the wall from an outer surface 50 to an inner surface 52 of the clutch 6, thereby providing space for accepting, and allowing access to, the two turned-out ends 24, 26 of the circlip 18 when the circlip 18 is arranged inside the bore 20.

As depicted in FIG. 5, the diameter $D_1$ of the circlip-accepting portion 28 of the tool 16 is smaller than a diameter $D_2$ of the bore 20 in the clutch 6, which allows the tool 16 to be arranged inside the bore 20. The first diameter of the circlip 18 may be larger than the diameter $D_2$ of the bore 20, however, the first diameter of the circlip 18 may be compressed to a smaller compressed diameter before, during, or as a result of insertion of the tool 16 and circlip 18 in the bore 20, for example under compression forces exerted by a ramp at the edge of the opening of the bore 20, in order to allow for the circlip 18 and the tool 16 to be arranged inside the bore 20.

Figure 6:
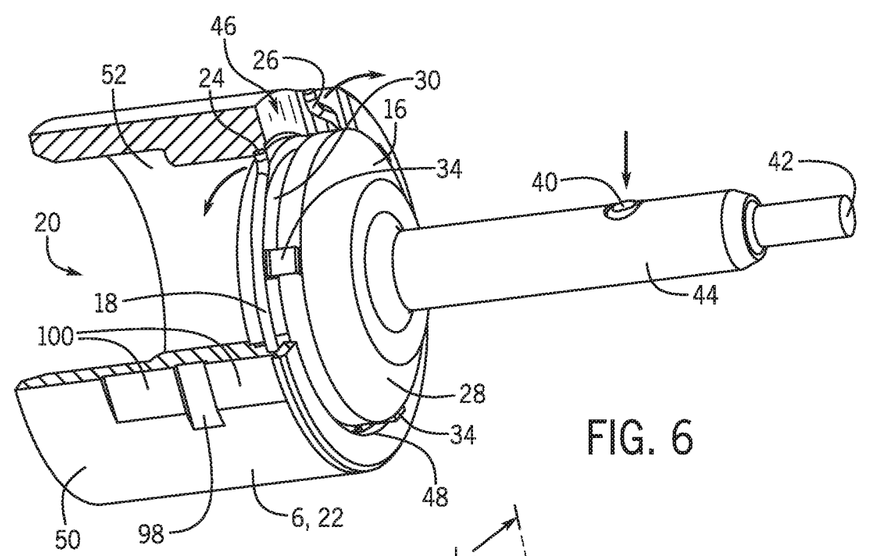
FIG. 6 is a perspective cut-away view of the circlip-expanding tool of FIG. 5, with the legs extended and the circlip in an expanded state in accordance with the present subject matter.

When the circlip 18 is arranged in the channel 30 and the circlip-accepting portion 28 of the tool 16 and the circlip 18 are arranged inside the bore 20 (FIG. 5), the tool 16 can be actuated (for example, by depressing the actuator 40 as indicated by the downward-pointing arrow on the right side of FIG. 6) to move the legs 34 from the retracted position to the extended position (FIG. 6). When the legs 34 are moved from the retracted position to the extended position, the circlip 18 is moved for example, as indicated by the two curved arrows on the left side of FIG. 6 from the relaxed state to the expanded state. In the expanded state, the circlip 18 can have a second diameter (i.e., the expanded diameter) larger than the first diameter. When the legs 34 are in extended position, the circlip-contacting surface 36 of the legs 34 engage the inside surface of the circlip 18 and exert an expansion force on the circlip 18 by pushing radially outward against the inside surface of the circlip 18 to expand the circlip 18 from the first diameter to the second diameter. Extension of the legs 34 may be limited by the clutch-contacting surfaces 38, wherein the clutch-contacting surfaces 38 contact the inner surface 52 of the clutch 6 when the legs 34 are extended to the extended position and therefore limit radial outward extension of the legs 34 so that the legs 34 cannot extend any further in a radial direction.

When the legs 34 are moved to the extended position, the circlip 18 may be expanded to the second diameter such that the circlip 18 is arranged in a circumferential groove 54 in the inner surface 52 of the clutch 6, and is not arranged in the channel 30 in the tool 16. In other words, the circlip 18 is pushed radially outward by the circlip-contacting surfaces 36 of the legs 34 so that the circlip 18 is arranged entirely outside the channel 30, wherein the entire circlip 18 is arranged radially outside the outer surface 32 of the circlip-accepting portion 28 of the tool 16.

When the circlip 18 has the second diameter, is arranged in the circumferential groove 54, and is not arranged in the channel 30, then a spacer 56 (FIG. 7), or a portion thereof, can be used to inhibit the circlip 18 from contracting under the elastic force of the circlip 18 towards the first diameter. The circlip 18 may be held to have the second diameter for example, by holding the actuator 40 in an actuated orientation as indicated by the downward-pointing arrow in FIG. 8. The use of the spacer 56 inhibits the circlip 18 from contracting towards the first diameter when the legs 34 are no longer in the extended position, and the spacer 56 prevents the circlip 18 from again being arranged in the channel 30. In one embodiment, when the spacer 56 is used to inhibit contraction of the circlip 18, the circlip 18 has a third diameter larger than the first diameter. The third diameter may be equal to, slightly smaller, or even slightly larger than the second diameter; but in any event is larger than the first diameter and prevents the circlip 18 from being arranged in the channel 30 of the tool 16. In one embodiment, the circlip 18, except for the two ends 24, 26, is arranged entirely inside the groove 54 of the clutch 6.

Figure 9:
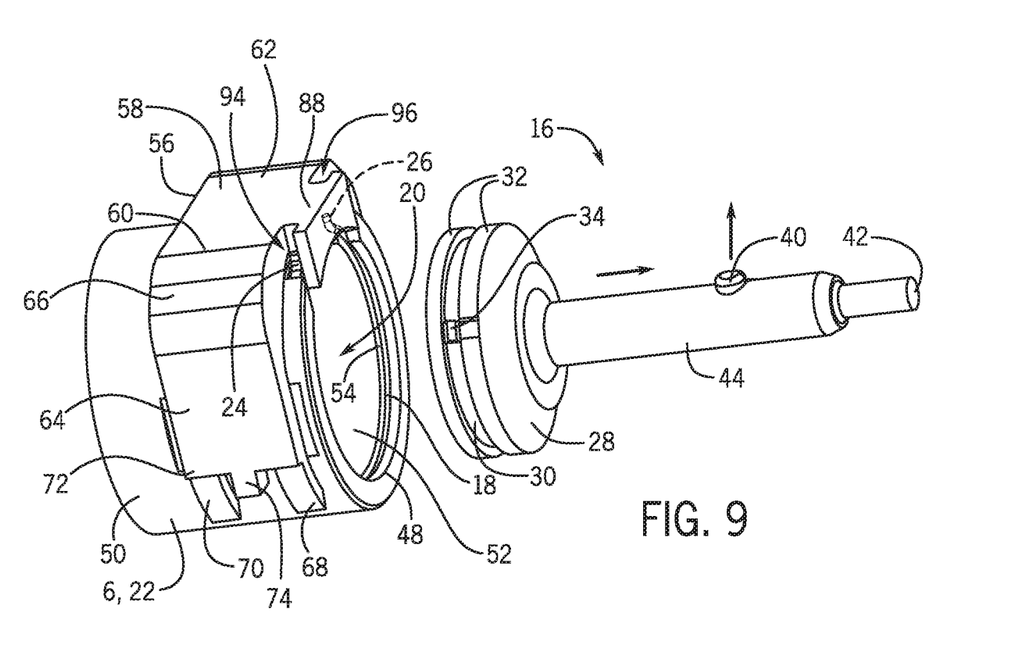
FIG. 9 is a perspective view of the assembly of FIG. 8, with the circlip-expanding tool removed from the bore in accordance with the present subject matter.

When the circlip 18 has the third diameter, the tool 16 can then be removed from the bore 20 for example, as indicated by the right-pointing arrow in FIG. 9, while leaving the circlip 18 in the bore 20 and in the groove 54. Before the tool 16 is removed from the bore 20, the legs 34 of the tool 16 can be retracted, for example by allowing the actuator 40 to move to an unactuated orientation as depicted for example, by the upward-pointing arrow in FIG. 9, so that the legs 34 retract towards the retracted position and so that the circlip-contacting surface 36 of the legs 34 no longer contact the circlip 18.

After the tool 16 is removed from the bore 20 and/or the legs 34 of the tool 16 are retracted toward the retracted position, contraction of the circlip 18 from the third diameter toward the first diameter is inhibited by at least a portion of the spacer 56 arranged between the two ends 24, 26 of the circlip 18.

Figure 7:
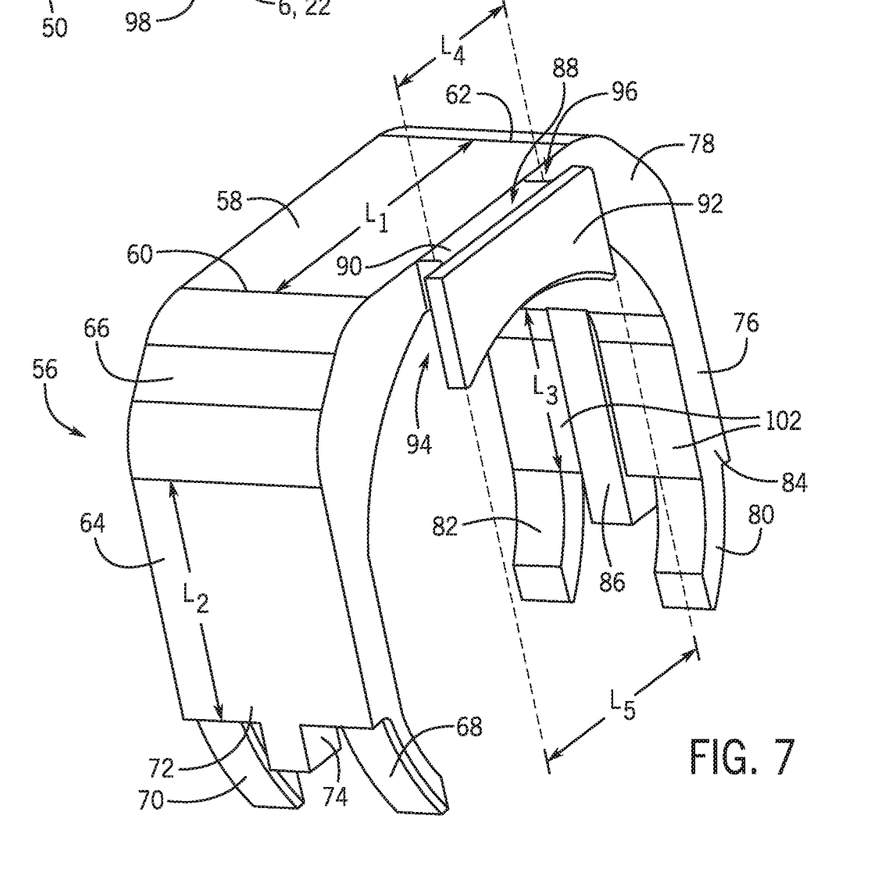
FIG. 7 is perspective view of a spacer in accordance with the present subject matter.
Figure 8:
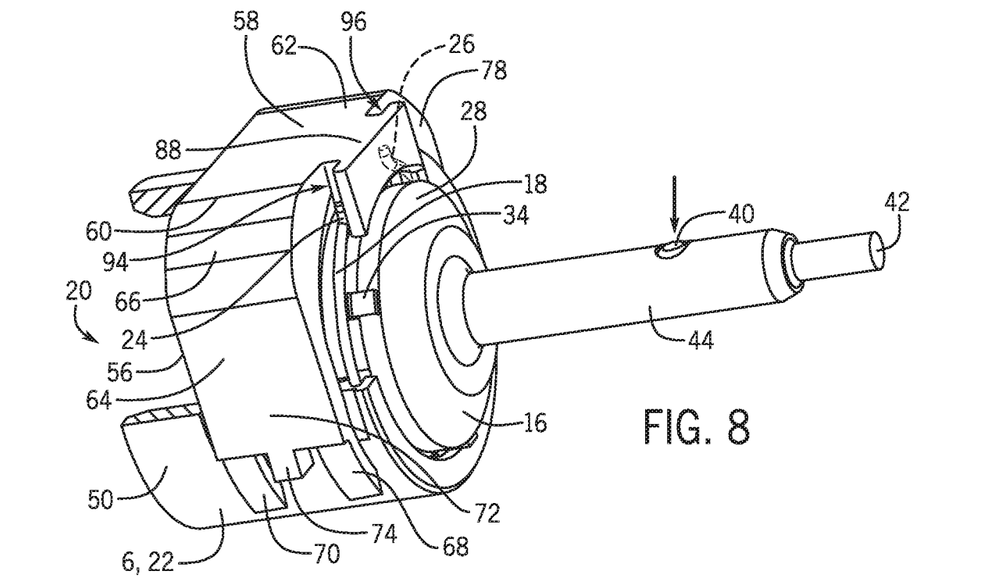
FIG. 8 is a perspective cut-away view of an assembly including the spacer of FIG. 7 snapped onto the assembly of FIG. 6 in accordance with the present subject matter.

As depicted in FIGS. 7-9, the spacer 56 is generally C-shaped, and includes a base 58 having a first end 60, a second end 62 opposite the first end 60, and a length $L_1$ measured between the first end 60 and the second end 62. The spacer 56 includes a first arm 64 extending downwardly from a first shoulder 66 arranged at the first end 60 of the base 58. The spacer 56 includes a second arm 76 extending downwardly from a second shoulder 78 arranged at the second end 62 of base 58. The first arm 64 includes first and second fingers 68, 70 extending from a first free end 72 of spacer 56 defined by first arm 64 and distal to the first shoulder 66. The second arm 76 includes third and fourth fingers 80, 82 extending from a second free end 84 of spacer 56 defined by second arm 76 and distal to the second shoulder 78. A first tab 74 extends downwardly beyond the first free end 72 between first and second fingers 68, 70. A second tab 86 extends downwardly beyond the second free end 84 between the third and fourth fingers 80, 82. As is shown for the second tab 86, the tabs 74, 86 also protrude inwardly beyond adjacent inner surfaces of the arms 64, 76, respectively, along lengths $L_2$ and $L_3$.

The spacer 56 includes a shelf 88 extending from the base 58 in a direction perpendicular to the length $L_1$ of the base 58 and perpendicular to the lengths $L_2$ and $L_3$ of the first and second arms 64, 76. The shelf 88 includes a trunk 90 adjacent the base 58 and a wall 92 spaced from the base. The trunk 90 has a length $L_4$ shorter than the length $L_5$ of the wall 92 such that gaps 94, 96 are defined on opposite sides of the trunk 90 between the wall 92 and the base 58. As shown, the wall 92 of shelf 88 extends downwardly beyond an inner surface of the base 58. A lower end of the trunk 90 (not seen) can also extend beyond the inner surface of the base 58.

When the circlip 18 has the second diameter, the trunk 90 is arranged between the two ends 24, 26 of the circlip 18 such that the two ends 24, 26 fit in the two gaps 94, 96 and are prevented from sliding out of the two gaps 94, 96 because of the wall 92 and the base 58 arranged on either side of the two ends 24, 26 while they are arranged in the gaps 94, 96. The length $L_4$ of the trunk 90 is sized to inhibit the circlip 18 from contracting towards the first diameter, and when the legs 34 of the tool 16 are retracted, the trunk 90 thereby secures the circlip 18 to have the third diameter.

The spacer 56 can be releasably attached around at least the outer surface 50 of the clutch 6 (FIGS. 8 and 9), when the spacer 56 is used to secure the circlip 18 to have the third diameter. In one embodiment, the outer surface 50 of the clutch 6 is generally circular, and can include two notches (one notch 98 depicted in the figures, and a second notch being identical and arranged on the opposite side of the clutch 6) arranged on either side of the clutch 6, which correspond in shape to, and mate with, the first and second tabs 74, 86 on the spacer 56 when the spacer 56 is releasably attached to the clutch 6. When mated, the tabs 74, 86 and notches inhibit axial movement of the spacer 56 relative to the clutch 6.

The first and second fingers 68, 70 and the third and fourth fingers 80, 82 on the spacer 56 are angled towards each other as they extend away from the respective free ends 72, 84 of the arms 64, 76 as shown in the figures. This configuration of the fingers 68, 70, 80, 82 provide a snap-type connection between the spacer 56 and the clutch 6, such that the snapped-on spacer 65 is inhibited from being inadvertently moved in a radial direction relative to the clutch 6. In this regard, free ends of the first and second fingers 68, 70 are spaced from free ends of the third and fourth fingers 80, 82 at a distance less than an outside diameter of the clutch 6, such that the fingers 68, 70, 80, 82, or other portions of the spacer 65, have to bend to allow for an increase in the distance between the free ends of the first and second fingers 68, 70 and the free ends of the third and fourth fingers 80, 82 in order to allow the clutch 6 to enter into, and exit out of, the space between the first and second arms 64, 76 and base 58.

The outside surface of the clutch 6 can also include two flat portions (one flat portion 100 shown in the figures, and a second flat portion being identical and arranged on the opposite side of the clutch 6) arranged on either side of the clutch 6 and flanking the two notches. The flat portions correspond in shape to, and mate with, flat interior surfaces (one flat interior surface 102 shown in the figures on the second arm 76, and a second flat interior surface being identical and arranged on the first arm 64) of the first and second arms 64, 76 when the spacer 56 is releasably attached to the clutch 6. Such mating of the flat portion on the clutch 6 and the flat interior surfaces of the first and second arms allow for proper alignment of the spacer 56 relative to the clutch 6 before the spacer 56 is completely snapped onto the clutch 6.

When the spacer 56 is releasably attached to the clutch 6 by being snapped onto the clutch 6, the shelf 88 is arranged in the slot 46 in the clutch 6 as best depicted in FIG. 9. The trunk 90 is arranged in between the two ends 24, 26 of the circlip 18, such that the two ends 24, 26 of the circlip 18 are arranged in the two gaps 94, 96. The circlip 18 is thereby secured to have the third diameter and is secured within the groove 54 of the clutch 6. With respect to the clutch 6, the spacer 56 is secured in a radial direction by the fingers 68, 70, 80, 82 snapping around the circumference of the clutch 6, and in an axial direction by the mating tabs 74, 86 and notches. In this arrangement, the clutch 6 can be stored, moved, or manipulated without disturbing the arrangement of the circlip 18 and spacer 56 relative thereto. The tool 16 can then be removed from the bore 20 while the circlip 18 is secured by the spacer 56 to have the third diameter and to be within the groove 54 (FIG. 9).

Figure 10:
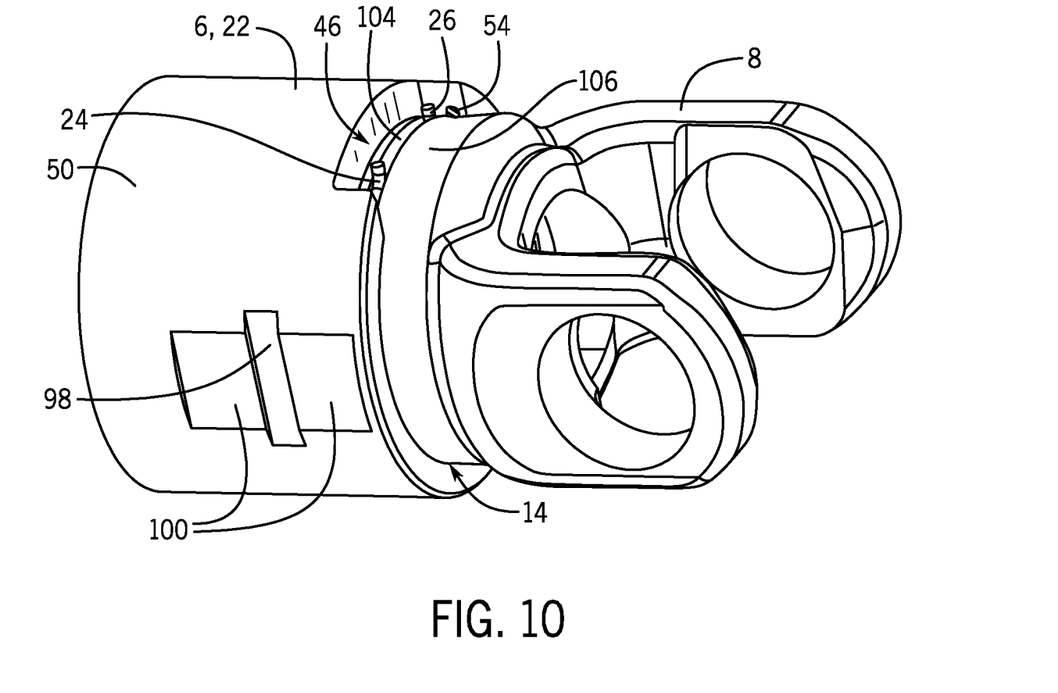
FIG. 10 is a perspective view of a yoke secured by a circlip to a clutch in accordance with the present subject matter.

After removing the tool 16 from the bore 20, the yoke 8 can be arranged inside the bore 20. The yoke 8 is generally in the form of a round cylinder, which is arranged inside the bore 20 and connected with the clutch 6 to the clutch 6. The yoke 8 includes a circumferential depression 104 in a circumferential outer surface 106 of the yoke 8. When the yoke 8 is inside the bore 20 and the depression 104 is aligned with the circlip 18, and when the circlip 18 has the third diameter, then the circlip 18 is not arranged in the depression 104. At this point, the spacer 56 can be removed from the clutch 6 to thereby allow the circlip 18 to contract toward to the first diameter and partially enter into the depression 104, thereby forming the circlip joint 14 between the clutch 6 and the yoke 8 (FIG. 10). Removal of the spacer 56 from the clutch 6 causes the trunk 90 to be removed from between the two ends 24, 26 of the circlip 18. In this event, the circlip 18 contracts under the elastic force of the circlip 18 toward the first diameter because the spacer 56 no longer inhibits the circlip 18 from contracting. The contraction of the circlip 18 toward the first diameter allows the circlip 18 to be arranged in both the depression 104 and the groove 54 to thereby establish the circlip joint 14 between the yoke 8 and the clutch 6.

The width and depth of the depression 104 is configured to allow the circlip 18 to be arranged only partially within the depression 104. The depression 104 may be similar to the channel 30 on the tool 16, but in one embodiment is less deep than the channel 30, which may prevent the circlip 18 from being arranged completely within the depression 104. When the circlip joint 14 is formed, the circlip 18 may contact a bottom of the depression 104 such that further contraction of the circlip 18 may be inhibited by the depression 104 and the circlip 18 may be arranged partially radially outside the outer surface 106 of the yoke 8, such that the circlip 18 also is partially arranged within the groove 54 to radially secure the yoke 8 relative to the clutch 6. When the circlip joint 14 is formed, the circlip 18 may have a fourth diameter, which is smaller than the third diameter. The fourth diameter may be equal to the first diameter, or slightly larger or even smaller than the first diameter.

If it is desired to break the circlip joint 14 and remove the yoke 8 from the clutch 6, the circlip 18 can be expanded from the fourth diameter back towards the third diameter so that the circlip 18 is no longer arranged in the depression 104. This will allow the yoke 8 to be removed from the bore 20 of the clutch 6. Such expansion of the circlip 18 may be accomplished by pushing apart the two ends 24, 26 of the circlip 18 from each other.

Since the clutch 6 is in a general shape of a tube and the yoke is in the general shape of a cylinder, it will be appreciated that the methods described herein for securing the yoke 8 relative to the clutch 6 can be applied to securing a cylinder-shaped object to a tube-shaped object.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for arranging an associated circlip inside an associated bore, the system including a tool to insert the circlip inside the bore and to expand the circlip from a first diameter to a second diameter larger than the first diameter, and a spacer to secure the circlip to have the second diameter when the circlip is arranged inside the bore, the tool comprising:
   a cylindrical circlip-accepting portion;
   a circumferential channel in an outer surface of the circlip-accepting portion, wherein the channel is configured such that the associated circlip can be selectively secured in the channel while having the first diameter;
   a plurality of legs arranged in the channel and including circlip-contacting surfaces, the legs being selectively moveable between a retracted position, wherein the circlip-contacting surfaces are arranged radially inside the outer surface of the circlip-accepting portion, and an extended position, wherein the circlip-contacting surfaces are arranged radially outside the outer surface of the circlip-accepting portion; and
   an actuator for actuating the tool to move the legs between the retracted position wherein the circlip arranged in the channel has the first diameter and can be inserted inside the bore, and the extended position to expand the circlip to have the second diameter such that the circlip is not arranged in the channel.

2. The system according to claim 1, wherein at least a portion of the spacer is configured to be arranged between two ends of the circlip to secure the circlip to have the second diameter when the circlip is arranged inside the bore.

3. The system according to claim 2, wherein the spacer comprises:
   a base having a first end, a second end distal from the first end, and a length measured between the first end and the second end;
   a first arm extending down from a first shoulder arranged at the first end of the base, and a second arm extending down from a second shoulder arranged at the second end of the base,
   the first arm including:
      a first finger and a second finger extending from a first free end of the first arm that is distal to the first shoulder; and
      a first tab protruding inward from the first arm and towards the second arm and extending along a length of the first arm;
   the second arm including:
      a third finger and a fourth finger extending from a second free end of the second arm that is distal to the second shoulder; and
      a second tab protruding inward from the second arm and towards the first arm and extending along a length of the second arm;
   a shelf extending from the base in a direction perpendicular to the length of the base and perpendicular to the lengths of the first and second arms, the shelf including a trunk and a wall,
   wherein the trunk is arranged between the base and the wall and the trunk has a shorter length than the wall, thereby defining two gaps on either side of the trunk between the wall and the base, and
   wherein the trunk is configured to be arranged between two ends of the circlip to secure the circlip to have the second diameter when the circlip is arranged inside the bore.

4. The system according to claim 3, wherein the shelf extends radially inside an inside surface of the base.

5. The system according to claim 1, wherein the plurality of legs includes at least three legs.

6. The system according to claim 5, wherein the legs are equally spaced around a circumference of the channel.

7. The system according to claim 1, wherein:
the legs include bore-contacting surfaces arranged radially inside the circlip-contacting surfaces; and
the bore-contacting surfaces are configured to contact an inner surface of the bore when the legs are in the extended position inside the bore.

8. The system according to claim 1, wherein the tool further includes a handle for holding the tool, wherein the actuator is arranged on the handle.

9. The system according to claim 1, wherein the tool is a power tool, and the actuator includes a button for actuating the tool.

10. The system according to claim 1, wherein the circlip-accepting portion has a diameter smaller than a diameter of the bore.

11. A method of arranging a circlip inside a tube using the system of claim 1, the method comprising:
arranging the circlip in the channel, wherein the circlip has the first diameter when arranged in the channel;
inserting the tool and the circlip inside the tube;
actuating the tool to expand the circlip from the first diameter to the second diameter so that the circlip is arranged in a circumferential groove in an inner surface of the tube and is not arranged in the channel;
using the spacer to secure the circlip to have the second diameter; and
removing the tool from the tube.

12. The method according to claim 11, wherein at least a portion of the spacer is arranged between two ends of the circlip when the circlip has the second diameter so that the circlip does not contract to the first diameter.

13. The method according to claim 12, wherein:
the spacer releasably attaches to the tube when the spacer secures the circlip to have the second diameter;
the spacer includes a shelf extending from a base;
the shelf is arranged in a slot in the tube and between the two ends of the circlip to secure the circlip to have the second diameter; and
the shelf includes two gaps into which the two ends of the circlip are arranged when the shelf is arranged between the two ends of the circlip.

14. The method according to claim 13, wherein
the spacer is C-shaped and includes a plurality of tabs arranged on an inner surface of the spacer and a plurality of fingers arranged at two distal ends of the C-shaped spacer;
the tube includes a plurality of notches in an outer surface of the tube; and
when the spacer secures the circlip to have the second diameter, the tabs are arranged within the notches to thereby inhibit axial movement of the spacer relative to the tube, and the fingers releasably attach the spacer to the tube in a radial direction.

15. The method according to claim 13, further including:
inserting a cylinder inside the tube, and
removing the shelf from between the two ends of the circlip such that the circlip contracts toward the first diameter and is thereby arranged partially within the groove and partially within a circumferential depression in an outer surface of the cylinder to thereby join the cylinder to the tube.

16. The method according to claim 15, wherein the tube is a clutch of a vehicle, and the cylinder is a propshaft yoke of the vehicle.

17. The method according to claim 13, wherein when the circlip is secured to have the second diameter by the spacer:
the shelf at least partially defines gaps in which the two ends of the circlip are arranged,
the shelf includes a wall at least partially defining the gaps, and
the wall inhibits the ends of the circlip from moving out of the gaps.

18. The method according to claim 11, wherein:
the legs include tube-contacting surfaces arranged radially inside the circlip-contacting surfaces; and
the tube-contacting surfaces contact an inner surface of the tube to limit radial outward extension of the legs when the tool is arranged inside the tube and is actuated.

19. The method according to claim 11, wherein the legs are moved to the retracted position before the tool is removed from the tube.

20. The method according to claim 11, wherein the tool is a power tool, and the actuator includes a button for actuating the tool.

* * * * *